United States Patent Office 2,991,796
Patented July 11, 1961

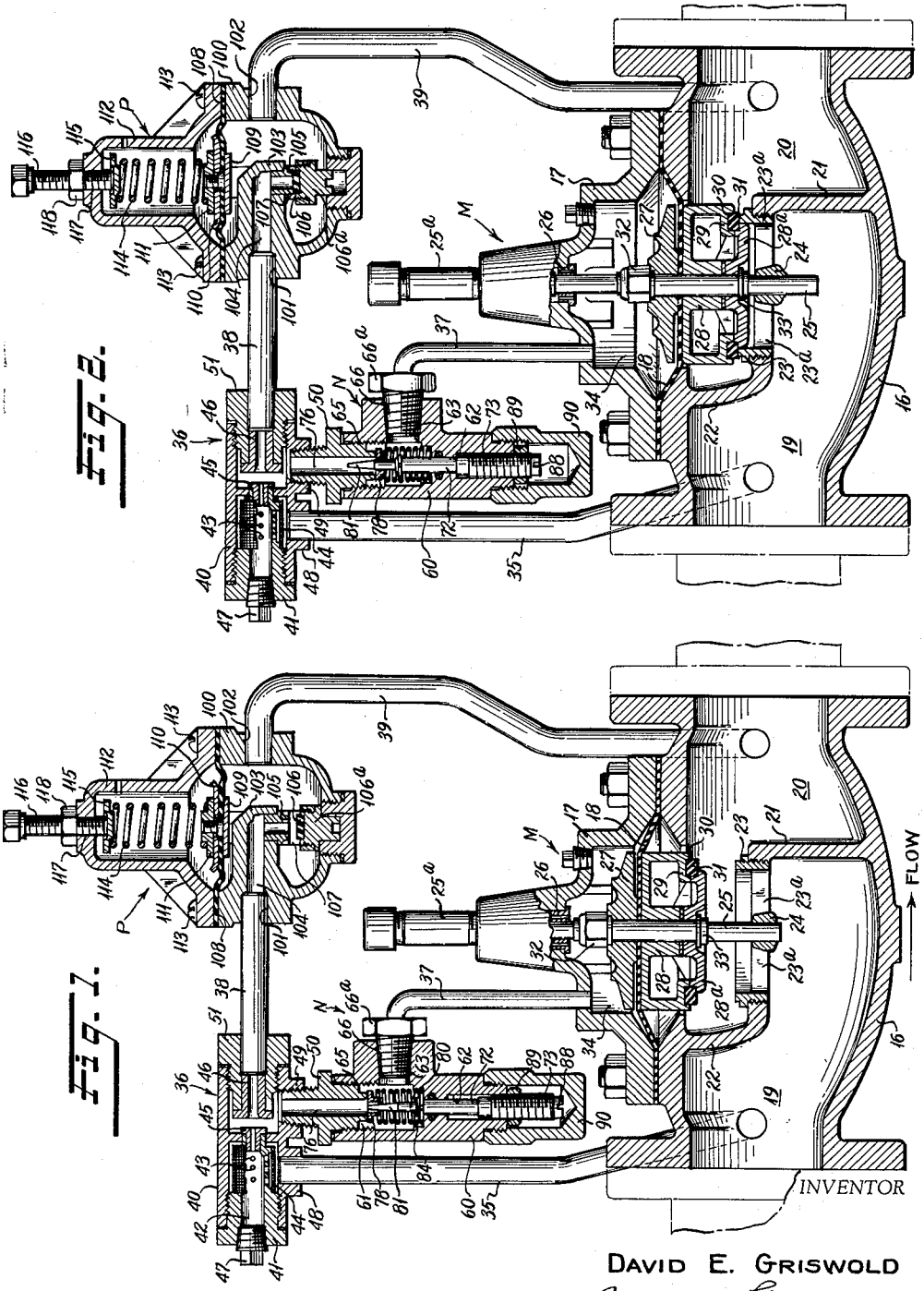

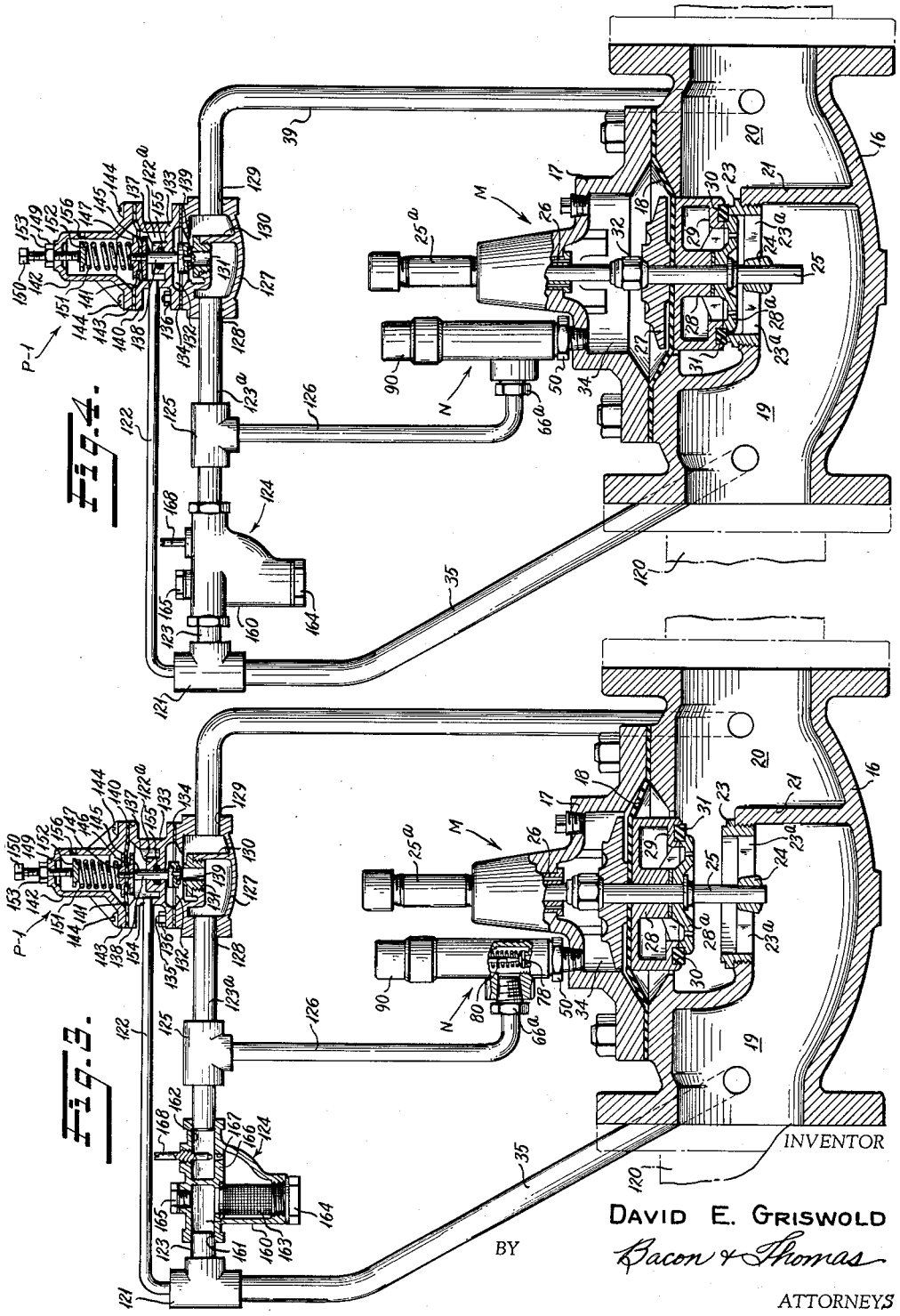

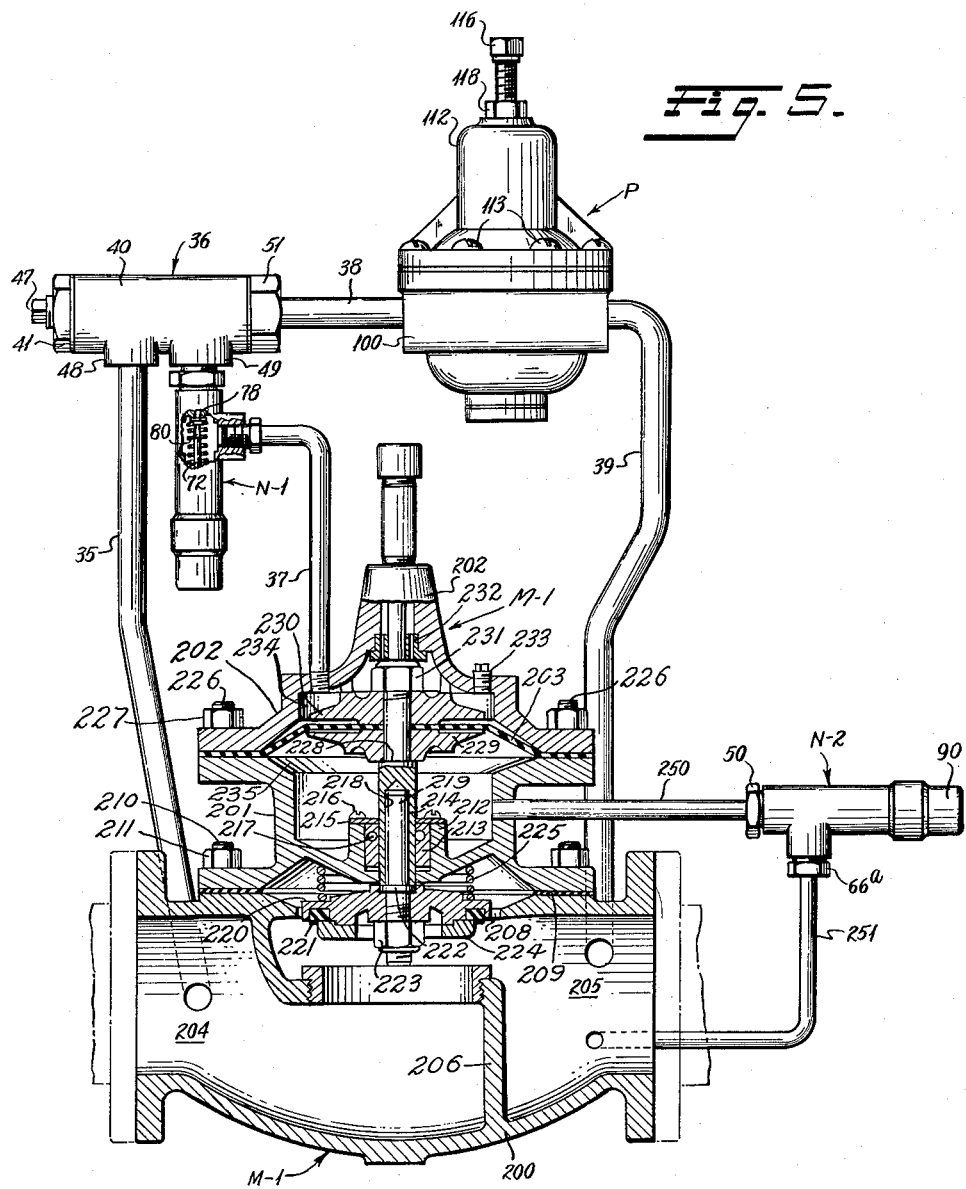

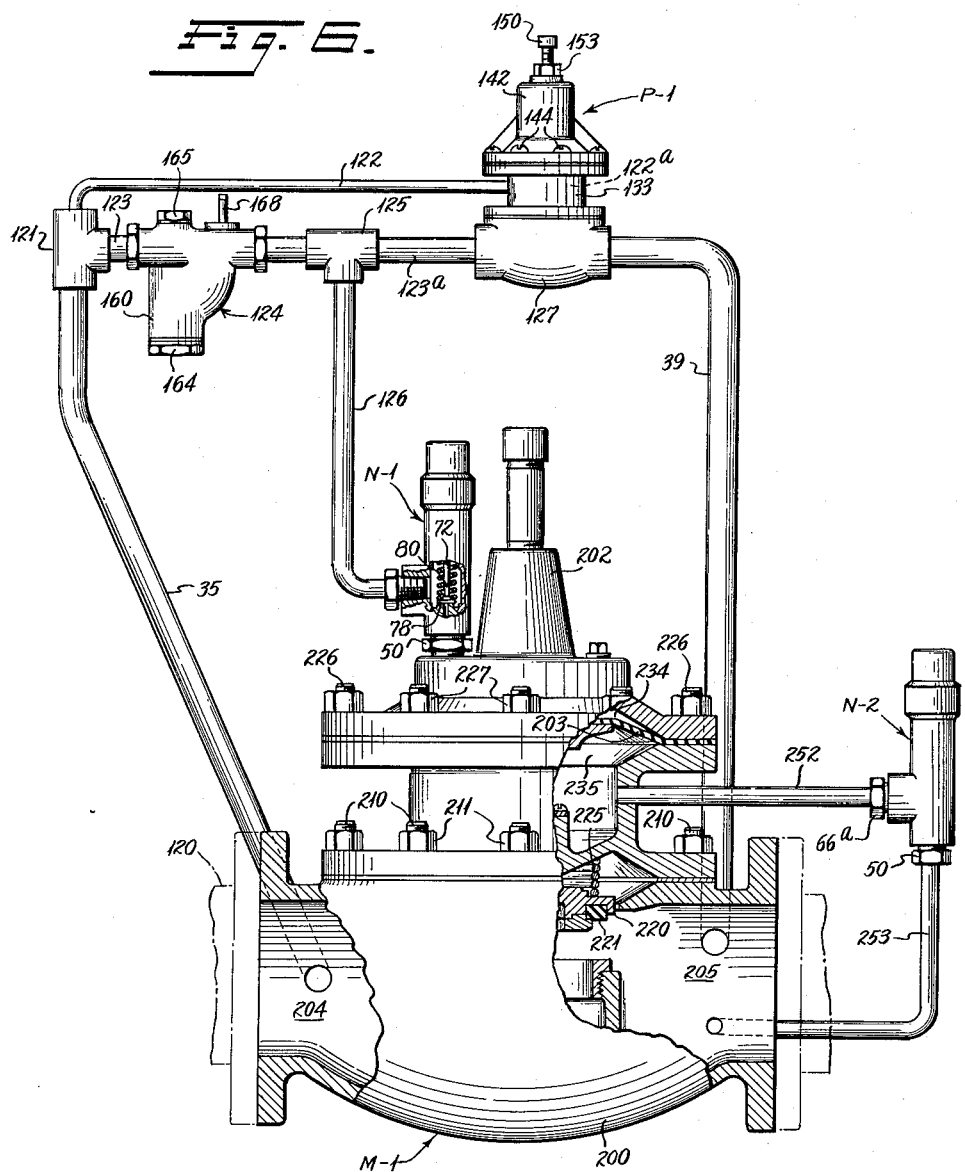

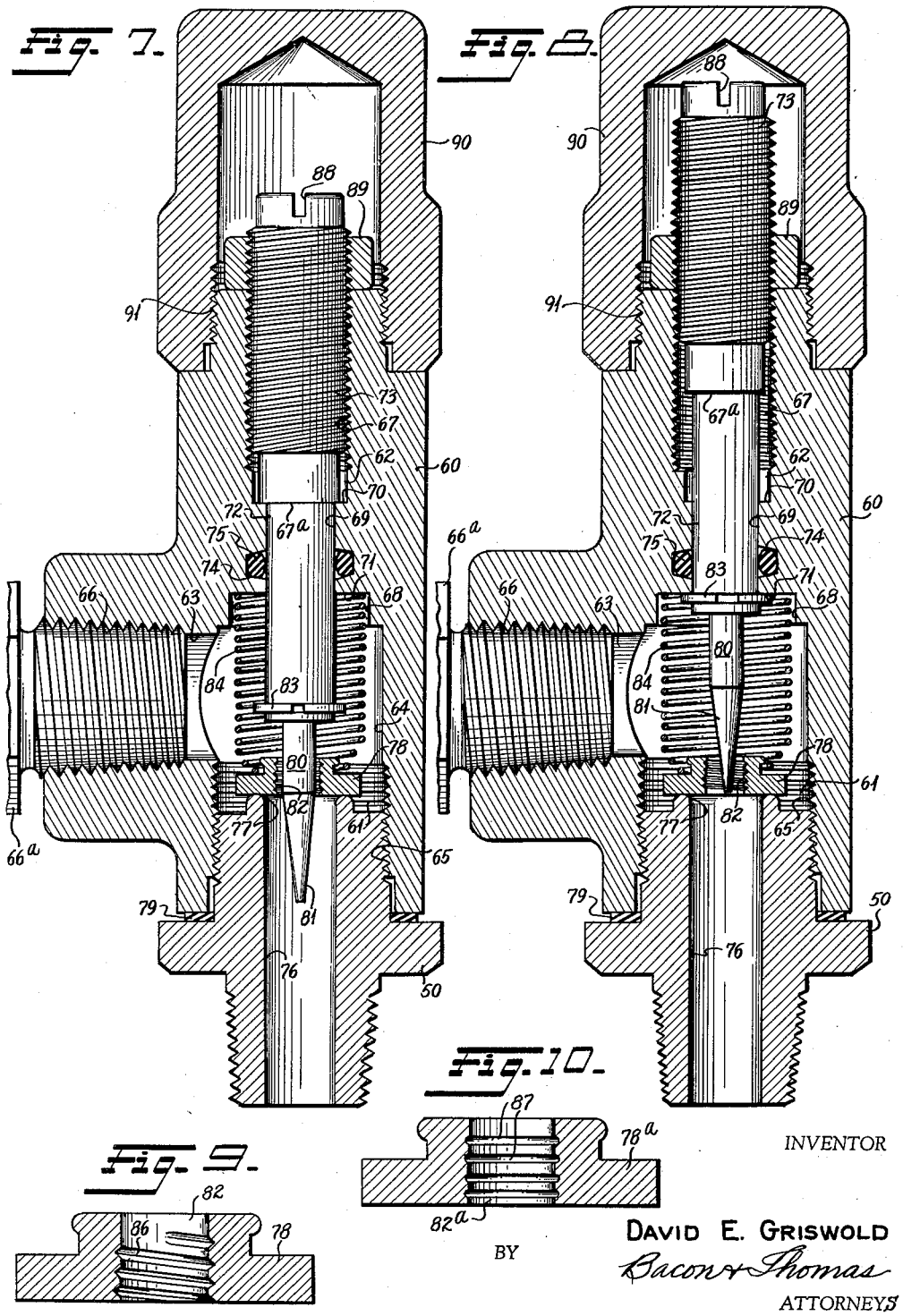

2,991,796
VALVES AND AUTOMATIC CONTROL MEANS THEREFOR
David E. Griswold, San Marino, Calif., assignor to Donald G. Griswold, Alhambra, Calif.
Filed Sept. 30, 1954, Ser. No. 459,496
16 Claims. (Cl. 137—489)

This invention relates to valves and, more particularly, to main valves having various combinations of automatically operable control elements associated therewith to effect pressure regulation, pressure relief, etc. while at the same time controlling the opening and/or closing speed of said main valves.

The invention broadly contemplates automatic valves with which means are included for controlling the speed of the valve opening and closing operations, whereby these operations may be performed at the same or at different selected speeds. On one embodiment thereof, the invention is especially advantageous in providing automatic valves for installations in which it is desirable to quickly accomplish one valve operation and to more slowly accomplish the reverse operation. For example, in some valve installations it is necessary to provide a valve that has a fast closing action and a slow opening action. Prior to the present invention, valves constructed for fast closing usually also provided for fast opening. However, where the system does not require fast opening it is more desirable that the valve open at a slower rate to avoid pulsations of delivery pressure. In systems requiring maintenance of a critical pressure condition on the outlet or downstream side of the valve, a fast opening valve presents a major problem due to the pulsation or cycling of the valve and consequent fluttering or pulsation of the delivery pressure.

It is desirable in some systems to provide a valve that has a fast closing rate and a relatively restricted opening rate. For example, in a system employing an automatic pressure reducing valve, the valve should preferably close rapidly to correct any excess pressure condition on its downstream side and reopen slowly at a controlled rate to avoid creating such condition.

It is desirable in other systems to provide a valve that has a fast opening operation and a relatively restricted closing rate. This is true, for example, of systems employing automatic pressure relief valves wherein it is desirable to provide a valve which will open quickly to take care of excessive pressure, or sudden surges in the pipe line, and which will close at a relatively slower, controlled rate to prevent line shock, chatter, and slamming of the valve disk against the seat.

Another example, in which a fast opening and slow closing valve operation is advantageous, is in systems employing float-controlled valves in a supply line to maintain a constant liquid level in a reservoir served by such line. In order to keep up with changes in reservoir level and maintain a substantially constant head of liquid, it is necessary that the valve in the supply line be quick opening. However, it is usually desirable to restrict the closing speed so that in the event that there is a sudden decrease in demand on the reservoir, the valve will not be allowed to close at a rate more rapid than can be tolerated in order to avoid water hammer or line shock that would otherwise result from stopping the liquid flow.

Another application of the invention resides in the provision of a control valve wherein both opening and closing operations are accomplished at a relatively slow adjustable rate. Such a valve is particularly advantageous for use with centrifugal pumps wherein it is desirable to start the pump against a closed valve, and to then slowly open such valve, and to slowly reduce the velocity in the discharge line by gradually closing the valve before the pump is stopped.

The present valves and control combinations provide relatively simple apparaus for accomplishing the types of control referred to above. In addition, the control elements provide for great sensitivity of operation of the main valves associated therewith and are readily adaptable for accomplishing a wide variety of valve control operations.

Accordingly, the principal object of this invention is to provide automatic valves having means connected therewith to selectively control the rate of opening and of closing, whereby the opening and closing operations may be accomplished at the same or at different selected speeds.

Another object is to provide automatic main valve and control combinations in which the control elements thereof may be readily arranged to provide different modes of operation of the main valve and also provide great flexibility in the control of the valve opening and closing rates.

Another object is to provide automatic valves of the type described wherein the function of controlling the opening and closing rates is accomplished by the provision of means of more simple construction and improved sensitivity than previously obtainable.

Another object is to provide an automatic valve having means providing a fast closing speed and a relatively restricted opening speed, thereby substantialy dampening out any tendency of the valve to pulsate during or after opening.

Another object is to provide an automatic valve having means providing a fast opening action and a more slowly operating closing action.

Another object is to provide automatic valves having means to provide independently adjustable opening and closing rates.

These and other objects and advantages hereinafter apparent from the ensuing description are accomplished in accordance with the present invention by the utilization of novel combinations of a fluid pressure operable main valve, an associated pilot valve or other control apparatus for controlling the supply of operating fluid to and the exhaust of operating fluid from the pressure chamber of the main valve, and one or more adjustable, combined needle and check valves for regulating the rate of flow of said operating fluid to and from said chamber.

The arrangement of the combined needle and check valve in the combination determines whether the main valve is fast opening and slow closing in response to the associated pilot valve, or other control member, or whether the reverse mode of operation takes place. In certain embodiments of the invention more than one combined needle and check valve may be employed in the assembly in order to selectively and adjustably control both opening and closing operations of the main valve.

The invention will be more fully understood by reference to the accompanying drawings in which:

FIG. 1 diagrammatically illustrates a pressure-reducing valve combination including a main valve, a pilot valve, and a combined needle and check valve, the main valve being in open position and the parts of the combination being arranged to provide quick closing of the main valve in response to the pilot valve upon development of excessive downstream pressure and a more restricted opening rate as determined by the combined needle and check valve upon return of normal pressure;

FIG. 2 is a diagrammatic illustration similar to FIG. 1 but in which the main valve and pilot valve are shown in the closed position they assume upon excessive downstream pressure and in which the needle and check valve is shown in an adjusted position different from that of FIG. 1;

FIG. 3 diagrammatically illustrates a pressure relief valve combination including a main valve, a pilot valve, and a combined needle and check valve, in which the needle and check valve is arranged in the combination in such a manner that the main valve is fast opening but is slow closing to prevent back surges, the parts of the apparatus being shown in the position they assume when the main valve and pilot valve are open;

FIG. 4 is a diagrammatic illustration similar to FIG. 3, but in which the main valve and pilot valve are shown in closed position;

FIG. 5 diagrammatically illustrates the arrangement of a power-operated main valve, having pressure chambers on each side of a diaphragm, with a pilot valve, and a pair of combined needle and check valves, whereby the main valve has a fast closing action and a relatively restricted opening action;

FIG. 6 diagrammatically illustrates the arrangement of a power-operated main valve and pilot valve with a pair of combined needle and check valves, whereby the main valve has a fast opening action and a relatively restricted closing action;

FIG. 7 is a vertical sectional view through a combined needle and check valve employed in the apparatus of FIGS. 1 through 6 showing the needle valve in a position of maximum restriction;

FIG. 8 is a view similar to FIG. 7 showing the needle valve in its position of minimum restriction;

FIG. 9 is an enlarged sectional view showing the construction of the disk which serves as a check valve in the combined needle and check valve shown in FIGS. 7 and 8; and FIG. 10 is a similar view showing a modified form of check valve disk.

Referring now to the drawings in detail, and in particular to FIGS. 1 and 2, thereof, which illustrate a quick-closing slow-opening valve combination especially adapted for pressure regulation on the delivery side, there is shown a main valve M, a pilot valve P, and a combined needle and check valve N. The main valve M comprises a body 16, a cover member 17 and a flexible diaphragm 18 disposed intermediate said body and cover. The body 16 is provided with an inlet chamber 19 and an outlet chamber 20 separated by a partition including an upright wall 21 and a downwardly extending wall 22, which provide an opening to receive a valve seat 23. Seat 23 is provided with a plurality of radial arms 23a, which merge centrally and provide a guide 24 for the lower end of a valve stem 25. The upper end of the valve stem 25 is guided in a bushing 26 mounted in the cover 17. Valve stem 25 extends through a central opening in the diaphragm 18 and carries a disk-like diaphragm supporting plate 27, which engages a portion of the upper surface of the diaphragm 18 and also carries a lower diaphragm supporting member 28 which engages a portion of the lower side of said diaphragm. The member 28 has an inwardly projecting flange 29 at its lower side provided with an annular recess 30 in which an annular sealing ring 31 is seated. The sealing ring 31 is adapted to engage the upper surface of the seat 23 when the valve is closed to prevent all flow between the inlet chamber 19 and the outlet chamber 20. A supporting disk 28a holds the sealing ring 31 in position and also supports the lower diaphragm supporting member 28. A lock nut 32 in cooperation with an enlarged portion 33 on the valve stem 25 secures the upper plate 27, diaphragm 18, lower diaphragm supporting member 28, and supporting disk 28a in assembled relation. The cover member 17 is constructed to provide a chamber 34 above the diaphragm 18 to receive fluid under pressure for effecting downward flexing of the diaphragm to cause the sealing ring 31 to engage with the seat 23 and thus close the valve M. The valve stem 25 is spring-loaded in a conventional manner by a spring (not shown) contained in pipe nipple 25a.

The inlet chamber 19 of the valve M is connected by a conduit 35 to an ejector-strainer generally designated at 36, which is in turn connected through the needle and check valve N, and a conduit 37 to the pressure chamber 34 of the main valve, and through conduit 38 to the inlet of pilot valve P. The outlet of pilot valve P is connected to the outlet chamber 20 of the main valve M by a conduit 39.

The ejector-strainer 36 may be of any conventional type and is shown as comprising a housing 40 accommodating a strainer assembly 41, which threadedly engages said housing at one end thereof and may be readily removed for cleaning or replacement. The strainer member 41 has an internal passage 42 provided at one end with a series of holes 43 for the passage of liquid. A cylindrical screen 44 covers the end of the strainer in the area of the holes 43. The internal end of the assembly 41 is provided with a nozzle 45 for forming a primary jet adapted to cooperate with a nozzle 46 in the other end of the body member 40 for forming a secondary jet. The end of the strainer assembly 41 opposite the nozzle 45 is provided with a plug 47, which may be removed for cleaning purposes. The body member 40 is further provided with a pair of lateral bosses 48 and 49 in which openings are provided for receiving one end of the conduit 35 and fitting 50 of the needle valve N, respectively. The nozzle 46 is disposed in a member 51, which threadedly engages member 40 and is provided with a central opening for receiving one end of the conduit 38. The ejector-strainer 36 thus prevents the entrance of foreign matter from the main line into the control elements thereby ensuring trouble-free operation, and also provides an ejector action for facilitating removal of fluid from the operating chamber 34 of the main valve M and reducing the pressure therein.

The combined needle and check valve N, shown in greater detail in FIGS. 15 and 16, comprises a housing 60 provided with aligned bores 61 and 62 in the ends thereof and with another bore 63 in its intermediate portion extending normally to the aligned bores 61 and 62. Bores 61, 62 and 63 all communicate with a chamber 64 within the housing 60.

In the manner in which the valve N is installed in the system of FIG. 1, bore 61 serves as an inlet for the flow of fluid through the housing 60 and is internally threaded as at 65 for the reception of the fitting 50 which in this embodiment of the invention connects the needle valve N to the ejector-strainer 36. Bore 63 serves as an outlet and is internally threaded as at 66 to receive a fitting 68a which connects said bore with one end of the conduit 37, which is connected to the fluid pressure chamber 34 of the main valve M.

The bore 62 includes axially spaced enlarged portions 67 and 68 (FIG. 7) and a relatively restricted intermediate portion 69 which provides shoulders 70 and 71 adapted to limit adjusting movement of a valve stem 72, as hereinafter described. The enlarged portion 67 is threaded for the reception of a correspondingly threaded portion 73 of the valve stem 72. An annular groove 74 in the restricted portion 69 of the bore 62 is provided with a conventional O-ring 75 to form a liquid-tight seal between the chamber 64 and the enlarged portion 67 of the bore 62. The fitting 50 is provided with a central passage or bore 76 which constitutes a port for the flow of liquid in either direction, and is further provided at its upper or inner end with a valve seat 77 adapted to contact a closure member or check valve disk 78. A gasket 79 prevents leakage between the fitting 50 and the housing 60.

The valve stem 72 has a reduced portion 80 at its lower end of a smooth cylindrical construction, which adjoins a tapered or conically shaped tip 81. The check valve disk 78 has a central bore 82 which surrounds the reduced cylindrical end portion 80, or the tapered end portion 81, of the valve stem, as shown in FIGS. 7 and 8, respectively, depending upon the degree of adjustment of the needle valve. The enlarged portion 73 of the valve stem 72 terminates in an abutment 67a adapted to engage the shoulder 70 to limit the movement of said valve stem to its position of minimum opening relative to the disk 78, as shown in FIG. 7. A lock washer 83 in a groove provided in the lower portion of the mid-section of the valve stem 72 is adapted to contact shoulder 71 at the point of maximum opening adjustment of said valve stem (FIG. 8) and provides a stop therefor.

The check valve disk 78 is normally urged by a compression spring 84 into engagement with the valve seat 77 on the fitting 50. As is best shown in FIGS. 9 and 10 the inner wall defining the bore 82 of the disk 78 is provided with an interrupted or serrated surface similar to that of a "fluid pack." To accomplish this end, the bore 82 may be tapped with a conventional thread tap to provide a shallow helical groove 86, as shown in FIG. 9 which extends substantially the length of the bore but terminates short of the upper end thereof. The cylindrical stem portion 80 may have a clearance of about one thousandth (0.001) to two thousandths (0.002) of an inch with respect to the cylindrical surface of the bore 82. With this construction, a turbulent flow is imparted to the liquid flowing from bore 63 into passage 76, through the slight clearance space between the wall of the bore 82 and the needle valve stem 80. This materially reduces the flow rate permitting a very fine adjustment, particularly when the stem portion 80 is adjusted so that it occupies the full length of the bore 82 to provide maximum restriction in the manner illustrated in FIG. 7.

In the modification shown in FIG. 10, the fluid pack is obtained in the bore 82a of the disk 78a by providing therein a series of spaced shallow annular grooves 87.

In order to obtain the desired adjustment of the valve stem portion 80 by advancing it in or out of the bore 82, the upper end of the valve stem 72 is provided with a kerf 88 for the reception of a screw driver. A lock nut 89 is provided to maintain the needle valve stem 72 in a selected adjusted position, and a cap 90 is mounted on a threaded extension 91 at one end of the housing 60 to enclose and thus protect the adjusting mechanism against damage or unauthorized tampering.

The adjustable mounting of the needle valve stem 72 is such that when it is screwed outwardly the tapered end 81 of the stem increases the clearance between the stem and the bore 82 of the disk 78, and correspondingly increases the flow volume through this member from bore 63 to passage 76, so that any desired rate of flow within the capacity of the needle valve device N can be effected through adjustment of said valve stem. It will be understood that the described construction provides for an extremely sensitive adjustment of the flow of fluid through the valve.

The operation of the combined needle and check valve N will be readily apparent. Thus, when a sufficient pressure differential exists from passages 76 to bore 63 to overcome the force of the spring 84, the disk 78 will be lifted upwardly from its seat 77 and will slide along the valve stem portion 80 so that substantially unrestricted flow of fluid will be permitted from passage 76 to bore 63. On the other hand, if the direction of greater pressure is reversed, the disk 78 will move to closed position very rapidly under the combined action of the fluid pressure and spring pressure, and the disk 78 will quickly position itself on the seat 77. Flow in this direction is therefore restricted in accordance with a desired preadjusted position of the valve stem portion 80 relative to the bore or orifice 82 in the disk 78. It will therefore be seen that the combined needle and check valve employed herein will permit substantially unrestricted flow in one direction and an extremely finely adjustable restricted flow in the opposite direction. The construction of this combined needle and check valve is described in greater detail in my co-pending application Serial No. 381,091 filed September 18, 1953, now Patent No. 2,925,243, issued February 16, 1960.

Returning now to FIGS. 1 and 2, the pilot valve P is shown as comprising a body 100 having an inlet opening 101 connected to one end of conduit 38 and an outlet opening 102 connected to one end of conduit 39. A partition 103 extending inwardly into the valve body 100 is provided with a channel 104, which communicates with the opening 101. The partition 103 is provided with a valve seat 105, which in cooperation with a valve disk 106 is adapted to control the flow of operating fluid through the pilot valve P and thereby control the operation of the main valve M. Valve disk 106 is held by a disk retainer 106a which threadedly engages a yoke-like valve stem 107. The stem 107 is adapted to be reciprocably operable in response to the action of a diaphragm 108 to urge disk 106 toward or away from its seat 105. The diaphragm 108 is secured to the valve stem 107 between an enlarged top portion 109 and a top plate 110 by means of a nut 111. The marginal edge of the diaphragm 108 is positioned between the body member 100 and a cover 112, which are held in assembled relation by screws 113. The cover 112 contains a compression spring 114, one end of which bears on the nut 111 above the diaphragm and the other end of which bears against an adjustable spring guide 115. The spring 114 tends to move the disk 106 away from the seat 105 to by-pass operating fluid around the chamber 34. An adjusting screw 116 threadedly engaging a bore 117 in the cover 112 provides for adjustability of the spring guide 115, whereby the pilot valve spring pressure may be adjusted to a predetermined set value. Lock nut 118 enables the adjusting screw 116 to be retained in any desired position.

The assembly shown in FIGS. 1 and 2 is especially useful as a pressure reducing device, wherein the main valve M functions primarily to limit the downstream pressure so as not to exceed a given pressure, as determined by the setting of the pilot valve P, and wherein it is necessary that the main valve have a fast closing operation. In the arrangement shown, the valve M will provide the desired fast closing operation, but will open more slowly and therefore eliminate the difficulties heretofore caused by fluttering or pulsation of delivery pressure. Accordingly, in operation, should the pressure in the downstream chamber 20 of the main valve M become excessive or greater than the set pressure of spring 114 of the pilot valve P, diaphragm 108 of the pilot valve will be flexed so as to partially or completely close this valve (as in FIG. 2) by urging the valve closure disk 106 against the valve seat 105, thereby preventing by-passing of operating fluid from the inlet 19 of main valve M through conduit 35, ejector-strainer 36, and pilot valve P to the downstream chamber 20. Sufficient fluid pressure will then immediately build up in the passage 76 to urge check valve disk 78, of the combined needle and check valve N, from its seat 77, thereby admitting operating fluid at full line pressure into the chamber 34 of the main valve M through the conduit 37. This in turn will cause the diaphragm 18 of the main valve M to be flexed downwardly to quickly close this valve.

When the downstream pressure has been reduced sufficiently to cause the pilot valve P to again open, as shown in FIG. 1, fluid will flow through conduit 35, nozzles 45 and 46, conduit 38, and through the pilot valve P and conduit 39 to the downstream chamber 20 of the main valve. Thus, the by-passing of operating fluid will be resumed to permit the main valve M to remain open. The action of the jets produced by the nozzles 45 and 46 will cause fluid to be withdrawn from the chamber 34 of the main valve M at a rate controlled by the adjustment of the needle valve stem portion 80 of the valve N. Thus, within the capacity of the setting of the needle valve N, the rate of opening of the main valve M can be closely controlled. By positioning the needle valve stem portion 80 as shown in FIG. 1, the rate of opening of the main valve M is adjusted to its maximum speed, whereas by positioning the needle valve stem as shown in FIG. 2, the rate of opening of the main valve is adjusted to the minimum. Any adjustment between the limits shown may be quickly made by turning the needle valve stem 72 as desired.

It will be understood that the pilot valve P will automatically open more or less, or close, in accordance with the variations in pressure on the downstream side of the main valve M, and that said main valve will correspondingly modulate in its operation, as required, to maintain a substantially constant pressure on its downstream side.

FIGS. 3 and 4 illustrate another embodiment of the invention wherein the main valve and control means is adapted to automatically maintain constant line pressure by by-passing or relieving excess pressure from a main line. In this embodiment, the main valve M may be placed in a by-pass line or pressure relief line designated 120. Since a relief valve is intended primarily to open to dissipate any normally excessive pressure at the inlet side of the valve, it is desirable that this type of valve be fast opening. It is permissible, however, in such usage to have a valve with a slow closing arrangement. The combination shown in FIG. 3 provides a fast opening main valve M which is adapted to close more slowly at an adjustable rate, whereby undesirable pulsations or water hammer are avoided.

The main valve M, as shown in FIG. 3, is similar to that previously described with respect to FIGS. 1 and 2, the difference in operation of the valve being the result of a different combination of control elements. Thus, the conduit 35 from the inlet side of the main valve M is connected to a T 121, which connects this conduit through a line 122 of reduced size to the operating chamber 122a of a power-operated pilot valve generally designated as P-1. T 121 also connects conduit 35, by means of a conduit 123, through a conventional strainer and needle valve generally designated at 124, and through a T 125, and conduit 123a, to the inlet chamber of the pilot valve P-1. A conduit 126 further connects T 125 to the outlet opening of a combined needle and check valve N, similar in construction to that shown in FIG. 1 and described above. The combined needle and check valve N is connected by the fitting 50 to the pressure chamber 34 of the main valve M. It will be noted that the combined needle and check valve N is shown installed in a reverse manner with respect to the main valve chamber 34 from that shown in FIG. 1. Accordingly, the valve M instead of being fast closing and slow opening, as in FIG. 1, is now arranged for fast opening and slow closing.

The pilot valve P-1 shown in FIG. 3 differs in structure from the pilot valve P shown in FIG. 1, in that it is power or pressure fluid operated in response to pressure from the inlet side of the main valve to control the flow of operating fluid to and from the chamber 34 of the main valve M. Pilot valve P-1 comprises a valve body 127 having an inlet opening 128 to which the conduit 123a is connected, and an outlet opening 129 to which one end of the conduit 39 extending from the downstream chamber 20 of the main valve is connected. A partition 130 in the valve body 127 separates the inlet and outlet openings 128, 129, respectively, and serves as a support for an annular valve seat 131. The body 127 has a central opening 132 axially aligned with the seat 131. A generally spool shaped intermediate valve section 133 is disposed above the valve body 127 and an annular gasket 134 is disposed between said intermediate section and said valve body. A plurality of studs 135 is mounted in the body 127 and extends through suitable openings in the gasket 134 and through a flange at the lower end of the intermediate section 133. Nuts 136 mounted on the studs 135 secure the valve section 133, gasket 134 and valve body 127 together in leak proof relation. The intermediate section 133 has a transverse wall 137 provided with a central opening in which a valve stem 138 is slidably mounted. The valve stem 138 has a recessed enlargement at its lower end and carries a valve disk 139 adapted to engage the valve seat 131 and shut off the flow of fluid through valve P-1.

The intermediate section 133 also has a flange 140 at its lower end. A flexible diaphragm 141 overlies the flange 140 and a cover 142 has a flange 143 engaged with the upper side of said diaphragm. A plurality of screws 144 secure the cover 142 and the diaphragm 141 to the flange 140. The valve stem 138 has a shoulder 145 disposed above the transverse wall 137 which forms an abutment for a diaphragm supporting washer 146 at the lower side of the diaphragm 141. A similar washer 147 is mounted upon the stem above the diaphragm 141 and is internally threaded so that it also serves as a clamping nut for securing the diaphragm 141 to the valve stem 138.

The cover 142 has a threaded boss 149 in which an adjusting screw 150 is mounted. A compression spring 151 is disposed within the cover 142 and its lower end is engaged with the washer 147 and its upper end is engaged with a spring guide 152 that bears against the inner end of the adjusting screw 150. A jam nut 153 locks the screw 150 in position. The intermediate section of the valve 133 provides a pressure chamber below the diaphragm 141 and an opening 154 in the cylindrical wall of this section accommodates the conduit 122 as previously described. An O-ring packing member 155 is mounted in the transverse wall 137 and forms a seal around the valve stem 138 between the outlet chamber 132 of the valve body 127 and the valve operating pressure chamber. The valve cover 142 has a vent opening 156 which connects the upper side of the diaphragm 141 to the atmosphere.

The strainer and needle valve 124 comprises a housing 160 having inlet and outlet ports 161 and 162, respectively. The housing contains a conventional strainer 163 and is provided with plugs 164 and 165 for cleaning purposes. A partition 166 separates the inlet and outlet ports 161 and 162 and is provided with a restricted orifice 167, the opening area of which may be controlled by an adjustable needle valve 168.

In the operation of the combination of FIGS. 3 and 4 for automatic pressure relief in the line 120 the main valve M and the pilot valve P-1 would normally be in closed position, as shown in FIG. 4, assuming normal pressure to be below the set operating pressure of the pilot valve P-1.

The main valve M would then be maintained in closed position by the pressure of the liquid in the chamber 34, in combination with the pressure of the spring (not shown) acting on the valve stem 25, which normally urge the valve stem and diaphragm 18 downwardly and the valve disk 31 towards its seat 23. Upon a pressure surge at the inlet side 19 of the main valve M, the pressure would be quickly transmitted to the chamber 122a of the pilot valve P-1 through the conduit 35 and line 122. The diaphragm 141 of the pilot valve P-1 would, therefore, be flexed upwardly against the pressure of spring 151 urging the valve disk 139 from its seat 131, as shown in FIG. 3, and thereby opening the valve P-1 permitting operating fluid to drain from pressure chamber 34 of the main valve M through conduit 126 and conduit 39 to the outlet chamber 20 of the main valve, at a rate faster than liquid can be supplied from the inlet chamber 19 of said main valve through the restricted opening 167 of the needle valve 124. During this operation, the check valve member 78 (FIG. 3) of the combined needle and check valve N will be raised from its seat permitting unrestricted flow of operating fluid from the valve chamber 34. The pressure in the inlet chamber 19 will cause the main valve disk 31 to be raised from its seat 23 and the main valve will quickly open, as shown in FIG. 3, permitting full flow of liquid from chamber 19 thus providing rapid pressure release.

The operation just described provides substantially instantaneous opening of the main valve M in response to pressure in the chamber 19 above the predetermined set value of the pilot valve P-1. After the pressure in chamber 19 has been reduced below the normal operating pressure of valve P-1, the spring 151 will cause this valve to close, as shown in FIG. 4, thereby preventing the flow of fluid from diaphragm chamber 34 of the main valve M to the outlet chamber 20 of this valve. Accordingly, fluid flowing through the needle valve 124 and through the combined needle and check valve N will enter operating chamber 34 and will act in cooperation with the spring loading of valve M to slowly close the valve M at a rate dependent upon the setting of the needle valve stem portion 80 in the combined needle and check valve N. It will be understood that the area of the opening between the needle valve portion 80 of the valve N and the bore 82 of the check valve disk 78 will be less than the area of the orifice 167 of the needle valve 124, and that the valve N will provide a much more sensitive adjustment of the rate at which the valve M closes than will said valve 124.

FIG. 5 illustrates another embodiment of the invention wherein the valve M in the system shown in FIGS. 1 and 2 is replaced by a power operated valve M-1 comprising a body 200, an intermediate spool-shaped section 201 and a cover member 202. A diaphragm 203 is interposed between the intermediate section and cover member. The body 200 is provided with an inlet chamber 204 and an outlet chamber 205 separated by a partition 206, which provides an opening to receive a valve seat 207. The body 200 has a central opening 208 axially aligned with the seat 207. The spool-shaped intermediate section 201 is disposed above the valve body 200 and an annular gasket 209 is provided between the intermediate section and the valve body. Studs 210 provided with nuts 211 hold these parts in assembled relation. The intermediate section 201 has a transverse wall 212 provided with a central opening containing a bushing 213 in which a valve stem 214 is slidably mounted. A plate 215, held to the wall 212 by screws 216 and having a central opening to accommodate the valve stem 214, retains the bushing 213 in proper position. An O-ring 217 is provided in a groove in bushing 213 to prevent leakage of fluid along the valve stem 214. The lower portion of the valve stem 214 has a bore 218 which slidably receives a member 219 attached to a plate 220 carrying a sealing ring 221. The plate 220 bears against a flange 222 on the member 219 and is held thereagainst by a lock nut 223, which threadedly engages the lower end of member 219. A retainer ring 224 holds the ring 221 in position on the plate 220. A spring 225 is provided between the top of plate 220 and the bottom of intermediate section 201 to urge the valve closure assembly downwardly toward its closed position in the event of pressure failure, irrespective of the position of valve stem 214.

The cover member 202 and diaphragm 203 are held in assembled relation with the intermediate section 201 by studs 226 and nuts 227. The valve stem 214 has a shoulder 228, which forms an abutment for a diaphragm supporting washer 229 at the lower side of the diaphragm 203. A similar washer 230 is mounted upon the stem above the diaphragm 203 and is held in place by a lock nut 231. A bushing 232 is provided in the cover member for maintaining the valve stem 214 in axial alignment. A plug 233 seals the pressure chamber 234 above the diaphragm 203. The valve M-1 is operated by the pressure differential in the fluid pressure chamber 234, above the diaphragm 203 and in the fluid pressure chamber 235 below said diaphragm. These operating chambers are connected by conduits 37 and 250, respectively, to the inlet sides of combined needle and check valves N-1 and N-2, respectively. The combined needle and check valves N-1 and N-2 are of the same structure as the valve N described in connection with FIGS. 1 to 4 and 7 and 8 above. Accordingly, the valves N-1 and N-2 are connected so that the passage of fluid from the operating chamber 234 and the passage of fluid to the operating chamber 235 are restricted to the extent determined by the setting of the needle valve portion 80. The details of construction of the ejector-strainer 36 and pilot valve P have been previously described. The system differs from that of FIGS. 1 and 2 primarily in that two needle and check valves, N-1 and N-2, are employed to control the opening and closing rates of the valve M-1. The installation of the valves N-1 and N-2, as shown in FIG. 5 is such that the valve M-1 becomes a fast closing and a slow opening valve. Accordingly, the inlet chamber 204 of the valve M-1 is connected by conduit 35, ejector-strainer 36, valve N-1, and conduit 37, to the upper pressure chamber 234 of the valve M-1. The flow of fluid to and from the chamber 234 is controlled by the pilot valve P, the inlet of which is connected by conduit 38 to the ejector-strainer 36, and the outlet of which is connected to the downstream chamber 205 of the valve M-1. The lower pressure chamber 235 of the valve M-1 is connected by a conduit 250 to the fitting 50 of valve N-2. A conduit 251 connects the downstream chamber 205 of the valve M-1 to the fitting 67 of the valve N-2, so that valve N-2 controls the interflow of fluid between outlet chamber 205 and diaphragm chamber 235.

The valve M-1 is adapted to function as a pressure reducer under control of the pilot valve P, as described in connection with FIGS. 1 and 2. However, the controls shown in FIG. 5 will provide a fast closing operation upon development of excessive pressure on the downstream side, and will cause the valve to open more slowly after the pressure has been reduced to eliminate difficulties usually caused by fluttering or pulsation of delivery pressure. Accordingly, in operation, should the pressure in the downstream chamber 205 become excessive or greater than the set pressure of the pilot valve P, the pilot valve will close, as before described, and cause operating fluid at full line pressure to be admitted into the upper chamber 234 of the valve M-1. This fluid pressure on top of the diaphragm 203 plus the action of the spring 225 will force the valve disk assembly to a closed position and in doing so will force fluid out of the lower chamber 235 through the conduit 250 and the valve N-2. The valve N-2 is preferably arranged to permit full flow of liquid to discharge from the chamber 235 through conduit 251 into the outlet chamber 205. Upon resumption of normal pressure, that is, reduction of pressure below the set operating pressure of the pilot valve P in the downstream line, the pilot valve P will again open and by-pass operating fluid around diaphragm chamber 234 in the same manner described in connection with FIG. 1. At the same time, spent operating fluid is withdrawn from the chamber 234 through conduit 37 and needle valve N-1 at a rate determined by the setting of the valve stem 72 thereof. Fluid will also flow into the lower chamber 235 through valve N-2 at a rate determined by the setting of its valve stem, which should be such that operating fluid can be supplied to the chamber 235 at a rate slightly in excess of that at which spent operating fluid can flow from chamber 235 through the valve N-1. Consequently, both chambers 234 and 235 are always full of fluid. As a general rule, it is preferred to effect the desired controlled rate of operation of the main valve M-2 by adjustment of the stem of the needle valve N-1 or N-2 to restrict the discharge from that chamber of the main valve from which operating fluid is being exhausted. In the instant arrangement, the rate of opening of the main valve M-1 is restricted, and consequently the valve N–1 is adjusted to control the rate at which operating fluid can be forced from the chamber 234 by the combined action of the operating fluid admitted into chamber 235 and line pressure acting upon the valve disk 220 tending to open the main valve.

FIG. 6 illustrates a further embodiment of the invention wherein a power operated valve M–1 of the type described in detail in connection with FIG. 5 is associated with a control system such as that shown in FIGS 3 and 4, in lieu of the valve M shown therein. The valve M–1 in this instance functions as a quick opening and slow closing pressure relief valve, and during normal operating conditions would be in a closed position. The valve M–1 is adapted to quickly open upon development of excessive pressure on the inlet side thereof and is shown in such open position in FIG. 6. In order for the valve to assume this position, pressure at the inlet chamber 204 would be transmitted through conduit 35, T 121 and conduit 122 to the control chamber 122a of the pilot valve P–1. When the pressure is in excess of the set operating pressure of the pilot valve P–1, it will open, as explained in connections with FIGS. 3 and 4 above, and permit operating fluid to be exhausted rapidly from the upper pressure chamber 234 of the valve M–1 through valve N–1, by lifting the disk 78 thereof off its seat, through conduit 126, T 125, conduit 123a, pilot valve P–1 and conduit 39 to the downstream chamber 205 of the valve M–1.

It will be understood that operating fluid may be exhausted through the open pilot valve P–1 at a much faster rate than fluid can be admitted from the conduit 35 through the needle valve strainer assembly 124, the setting of the needle valve 168 being such as to regulate flow in this direction. Hence, when the pilot valve P–1 is fully open, operating fluid cannot be supplied in sufficient volume to close the main valve M–1. The installation of the valve N–1 in this assembly is such as to permit rapid flow of fluid from the chamber 234 without any substantial restriction. Fast opening of the valve M–1 is further facilitated by rapidly admitting operating fluid into the lower pressure chamber 235 through conduit 252, valve N–2, and conduit 253, after the valve M–1 has started to open. In this connection, the installation of the valve N–2 is such that the check valve disk therein is raised to permit rapid flow of fluid through this valve and into the lower pressure chamber 235. After restoration of normal pressures in the upstream valve chamber 204, that is, pressure below the set operating pressure of the pilot valve P–1, the valve P–1 will close and fluid will be admitted into the upper chamber 234 of valve M–1 at a rate controlled by the setting of the needle stem portion 80 of the valve N–1. Accordingly, line pressure will build up in the chamber 234 and this, in addition, to the pressure of the spring 225 will urge the valve member 220 to a closed position. At the same time, fluid in the lower chamber 235 will be forced out through conduit 252, valve N–2 and conduit 253 to exhaust into the downstream chamber 205 of the main valve M–1. It will be noted that the installation of the valve N–2 also affords adjustment to be made to restrict the rate at which operating fluid is exhausted from the chamber 235. Accordingly, either the valve N–1 or the valve N–2, or both, may be made to control the rate at which the valve closes. Preferably the closing speed is primarily controlled by adjusting the valve N–2 to restrict the rate of exhaust of fluid from chamber 235 under the force of pressure fluid admitted into chamber 234 at a rate controlled by valve N–1.

It will be understood that the arrangement of the combined needle and check valves N–1 and N–2 in the systems shown in both FIGS. 5 and 6 may be reversed, whereupon the rates of opening and closing of the main valves are reversed.

It will be understood that various changes may be made in the details of construction and in the arrangement of the parts of the main valves, control valves, combined needle and check valves, and auxiliary apparatus disclosed herein, without departure from the principles of the invention or from the scope of the annexed claims.

I claim:

1. In combination, a fluid-pressure operable valve, including an inlet chamber, an outlet chamber, a pressure chamber for operating fluid, and closure means responsive to pressure in said pressure chamber for controlling the flow of operating fluid between said inlet and outlet chambers; by-pass conduit means interconnecting said inlet chamber and outlet chamber whereby a flow of operating fluid by-passing said closure means may be established; control means in said by-pass conduit means responsive to the pressure in said outlet chamber to control the flow of fluid through said by-pass conduit means; an ejector in said by-pass conduit means upstream of said control means and means including a combined needle and check valve connecting said pressure chamber with said ejector so that operating fluid is supplied to said pressure chamber from the inlet chamber of said valve and is exhausted from said pressure chamber to the outlet chamber of said valve in response to said control means, said combined needle and check valve being arranged to restrict the rate of flow of operating fluid from said pressure chamber and to permit substantially greater rate of flow of operating fluid to said pressure chamber, whereby said valve may be quickly closed and relatively slowly opened.

2. Means for controlling fluid flow through a pipe line, comprising: a main valve adapted to be connected in said pipe line and having a body provided with inlet and outlet chambers, and means including a pressure chamber for controlling the flow of operating fluid through said body; and control means communicating with said pressure chamber and responsive to the fluid pressure in said pipeline for supplying and exhausting operating fluid, said last-mentioned means including a combined needle and check valve having a housing provided with an inlet port and an outlet port, a valve seat located in one of said ports, a check valve member adapted to seat on said valve seat, said check valve member comprising a disk, having a centrally located bore therein, and an adjustable needle valve stem mounted in said housing having a conical and cylindrical portion extending into and through the bore in said disk, whereby substantially full flow of operating fluid is permitted by said needle and check valve in one direction and a more restricted flow is permitted in the reverse direction, whereby said main valve is caused to open and close at different rates.

3. The combination defined in claim 1, in which the control means includes a pilot valve in said by-pass conduit means, and means, responsive to the pressure in the outlet chamber and connected to said pilot valve, to regulate the position of the pilot valve as a function of the pressure in the outlet chamber.

4. The combination defined in claim 1, including another pressure chamber, a member disposed between said pressure chambers movable in response to the pressure difference between said pressure chambers, an operating connection between said movable member and said closure means, conduit means connected with said other pressure chamber for admitting and exhausting operating fluid, and another combined needle and check valve connected with said latter conduit means to permit substantially full flow of operating fluid in one direction and a restricted flow in a reverse direction.

5. The combination defined in claim 1, including another pressure chamber, a member disposed between said pressure chambers movable in response to the pressure difference between said pressure chambers, an operating connection between said movable member and said closure means, conduit means connected with said other pressure chamber for admitting and exhausting operating fluid, and another combined needle and check valve connected with said latter conduit means to permit substantially full flow of operating fluid from said other pressure chamber and a restricted flow thereto.

6. Means for controlling fluid flow through a pipe line as defined in claim 1, in which said control means includes a pilot valve controlling the supply and exhaust of operating fluid, and pressure responsive means, connected to said pilot valve, subject to the pressure in said pipe line.

7. Means for controlling fluid flow through a pipe line as defined in claim 2, in which the check valve remains seated, in response to flow to said pressure chamber, to permit substantial restricted flow of operating fluid to said pressure chamber, and unseats, in response to flow from the pressure chamber, to permit a substantially greater flow of operating fluid from said pressure chamber.

8. Means for controlling fluid flow through a pipe line as defined in claim 2, in which said control means includes conduit means conveying an operating fluid under pressure, a branch line connected between said conduit means and said pressure chamber for supplying and exhausting operating fluid, means, in said conduit means downstream of the connection with the branch line, responsive to the fluid pressure in the pipe line, for controlling the flow of operating fluid in said conduit means and thereby the supply and exhaust of operating fluid to said pressure chamber, said combined needle and check valve being disposed in said branch line for restricting the rate of flow of operating fluid from said chamber and permitting a substantially greater rate of flow of operating fluid thereto.

9. Means for controlling fluid flow through a pipe line as defined in claim 2, in which said main valve relieves excess pressure in said pipe line, and in which the control means is responsive to the pressure on the inlet side of said main valve, and in which the check valve remains seated in response to flow of operating fluid to said pressure chamber and is unseated in response to flow of operating fluid from said pressure chamber, whereby the main valve may be quickly opened in response to said control means and closed at a relatively restricted rate.

10. Means for controlling fluid flow through a pipe line as defined in claim 2, in which said main valve is movable to reduce pressure in said line by restricting flow therethrough, and in which the control means includes conduit means conveying an operating fluid under pressure, a branch line connected between said conduit means and said pressure chamber for supplying and exhausting operating fluid, pressure responsive means in said conduit means, downstream from the connection with the branch line, responsive to pressure variations at the outlet side of said main valve, for controlling the flow of operating fluid in said conduit means, said combined needle and check valve being disposed in said branch line and restricting the rate of flow of operating fluid from said chamber, and permitting a substantially greater rate of flow of operating fluid thereto.

11. Means for controlling fluid flow through a pipe line as defined in claim 2, in which said control means includes a by-pass conduit means interconnecting said inlet and outlet chambers whereby a flow of operating fluid by-passing said main valve is established, a diverting conduit connected between said by-pass conduit means and said pressure chamber for diverting operating fluid from said by-pass conduit means to said pressure chamber, means connected in said by-pass conduit means, downstream from the connection with the diverting conduit and responsive to the pressure on the outlet of said main valve, to control the flow of fluid in said by-pass conduit means and thereby control the pressure of operating fluid in said pressure chamber for effecting the opening and closing of said main valve, said combined needle and check valve being disposed in said diverting conduit.

12. Means for controlling fluid flow through a pipe line as defined in claim 2, in which said control means includes an operating fluid supply conduit connected with the inlet side of the main valve and an operating fluid exhaust conduit connected with the outlet side of the main valve, means connecting said conduits including a branch line to said pressure chamber, pressure responsive means, responsive to the pressure on the inlet side of said main valve, controlling the exhaust of operating fluid from said pressure chamber, means in said operating fluid supply conduit restricting the supply of operating fluid to said pressure chamber at a rate below that permitted by the operating pressure fluid exhaust control means, said combined needle and check valve being disposed in said branch line and restricting the flow of operating fluid to said pressure chamber and permitting the flow of operating fluid from said pressure chamber at a substantially greater rate.

13. Means for controlling flow through a pipe line as defined in claim 2, wherein said means for controlling the flow of operating fluid through said body includes another pressure chamber, a member disposed between said pressure chambers movable in response to the pressure difference between said pressure chambers, an operating connection between said movable member and said main valve, conduit means connected to said other pressure chamber for admitting and exhausting operating fluid, and another combined needle and check valve connected with said latter conduit means to permit substantially full flow of operating fluid in one direction and a restricted flow in a reverse direction.

14. Means for controlling flow through a pipe line as defined in claim 13, in which one combined needle and check valve restricts the flow of operating fluid to one pressure chamber and permits a substantially greater rate of flow therefrom, and in which the other combined needle and check valve restricts the rate of flow from the other pressure chamber and permits a substantially greater rate of flow thereto.

15. Means for controlling fluid flow through a pipe line as defined in claim 13, in which the combined needle and check valve connected with the first mentioned pressure chamber permits substantially unrestricted flow of operating fluid therefrom and restricts the flow thereto, and in which the combined needle and check valve in the conduit means connected with said other pressure chamber restricts the flow of operating fluid from said pressure chamber and permits substantially unrestricted flow of operating fluid thereto.

16. Means for controlling fluid flow through a pipe line as defined in claim 13, in which the combined needle and check valve connected with the first mentioned pressure chamber restricts the flow of operating fluid from said chamber and permits substantially unrestricted flow of operating fluid thereto, and in which the combined needle and check valve in the conduit means connected with said other pressure chamber restricts the flow of operating fluid to said other pressure chamber and permits substantially unrestricted flow of operating fluid therefrom.

References Cited in the file of this patent
UNITED STATES PATENTS

| | | |
|---|---|---|
| 1,311,536 | Smoot | July 29, 1919 |
| 1,504,620 | Good | Aug. 12, 1924 |
| 1,814,530 | Spence | July 14, 1931 |
| 2,000,002 | Stockmeyer | Apr. 30, 1935 |
| 2,417,217 | Schreck | Mar. 11, 1947 |
| 2,603,192 | Kensok | July 15, 1952 |